(12) United States Patent
Kim et al.

(10) Patent No.: US 9,485,449 B2
(45) Date of Patent: Nov. 1, 2016

(54) METHOD FOR PROVIDING GUI FOR SELECTING BROADCAST CHANNEL WITH KEYPAD OPERATED BY POINTER AND BROADCAST RECEIVING APPARATUS THEREOF

(71) Applicant: SAMSUNG ELECTRONICS CO., LTD., Gyeonggi-do (KR)

(72) Inventors: Joon-hwan Kim, Yongin-si (KR); Young-hwa Yun, Seoul (KR); Jeong-yeon Lee, Seongnam-si (KR); Seong-ick Jon, Seoul (KR); Woo-seok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/966,041

(22) Filed: Aug. 13, 2013

(65) Prior Publication Data
US 2013/0329141 A1 Dec. 12, 2013

Related U.S. Application Data

(63) Continuation of application No. 13/615,796, filed on Sep. 14, 2012, and a continuation of application No. 11/836,934, filed on Aug. 10, 2007, now abandoned.

(30) Foreign Application Priority Data

Jan. 26, 2007 (KR) .................. 10-2007-0008525

(51) Int. Cl.
*H04N 5/445* (2011.01)
*H04N 5/44* (2011.01)
(Continued)

(52) U.S. Cl.
CPC ........ *H04N 5/4403* (2013.01); *H04N 21/4312* (2013.01); *H04N 21/4383* (2013.01); *H04N 21/482* (2013.01); *H04N 21/42222* (2013.01); *H04N 2005/4432* (2013.01)

(58) Field of Classification Search
CPC ........... H04N 21/42204; H04N 21/47; H04N 21/472; H04N 21/482; H04N 21/4821
USPC ...................................... 725/38, 56
See application file for complete search history.

(56) References Cited

U.S. PATENT DOCUMENTS 5,539,479 A * 7/1996 Bertram ......................... 725/37
5,889,506 A 3/1999 Lopresti et al.
(Continued)

FOREIGN PATENT DOCUMENTS

CN 1282195 A 1/2001
CN 1342365 A 3/2002
(Continued)

OTHER PUBLICATIONS

Chinese Office Action issued Aug. 3, 2011 in corresponding Chinese Patent Application No. 200710192829.6.
(Continued)

*Primary Examiner* — James R Sheleheda
(74) *Attorney, Agent, or Firm* — Sughrue Mion, PLLC (57) ABSTRACT

A method for providing Graphical User Interface (GUI) for selecting a broadcast channel, and a broadcast receiving apparatus having the same are provided. The GUI for selecting a broadcast channel includes a keypad having a pointer to be moved by manipulation of a user on a remote control apparatus and keys selectable by the pointer, and then the user is able to input a preferred broadcast channel by using the keypad and the pointer. Accordingly, the user is able to input a preferred broadcast channel without using the number keys, so the number keys may be omitted in the remote control apparatus. As a result, miniaturization of the remote control apparatus is possible.

22 Claims, 9 Drawing Sheets

(51) Int. Cl.
*H04N 21/438* (2011.01)
*H04N 21/431* (2011.01)
*H04N 21/482* (2011.01)
*H04N 21/422* (2011.01)

(56) References Cited

U.S. PATENT DOCUMENTS

| | | | |
|---|---|---|---|
| 6,215,417 B1 | 4/2001 | Krass et al. | |
| 6,501,516 B1 | 12/2002 | Clapper | |
| 6,640,337 B1* | 10/2003 | Lu | G06F 3/033 348/734 |
| 6,642,939 B1* | 11/2003 | Vallone et al. | 715/721 |
| 6,661,472 B2* | 12/2003 | Shintani et al. | 348/732 |
| 6,724,368 B2 | 4/2004 | Strubbe | |
| 6,766,526 B1* | 7/2004 | Ellis | 725/57 |
| 8,301,648 B2* | 10/2012 | Poniatowski | G06F 17/30646 386/238 |
| 8,549,578 B2* | 10/2013 | Herigstad | H04N 7/163 725/109 |
| 2002/0100063 A1* | 7/2002 | Herigstad | H04N 7/163 725/141 |
| 2002/0162108 A1* | 10/2002 | Lin-Hendel | 725/52 |
| 2003/0128187 A1 | 7/2003 | Strubbe | |
| 2004/0078816 A1* | 4/2004 | Johnson | H04N 5/44543 725/52 |
| 2004/0095268 A1 | 5/2004 | Miyazaki | |
| 2004/0250278 A1 | 12/2004 | Imai et al. | |
| 2005/0028206 A1* | 2/2005 | Cameron | H04N 7/17309 725/46 |
| 2005/0210503 A1 | 9/2005 | Tsuji | |
| 2006/0026636 A1* | 2/2006 | Stark | H04N 5/44543 725/37 |
| 2006/0117342 A1* | 6/2006 | Park | H04N 5/4401 725/37 |
| 2006/0197745 A1 | 9/2006 | Yokozawa | |
| 2006/0253874 A1* | 11/2006 | Stark | G06F 3/038 725/62 |
| 2007/0157232 A1* | 7/2007 | Dunton et al. | 725/37 |
| 2007/0240187 A1* | 10/2007 | Beach | H04N 5/44543 725/53 |
| 2008/0184324 A1* | 7/2008 | Yun | H04N 5/4403 725/131 |
| 2010/0218211 A1* | 8/2010 | Herigstad | H04N 7/163 725/34 |
| 2010/0251162 A1 | 9/2010 | Stallings et al. | |
| 2011/0035774 A1* | 2/2011 | Parker | H04N 5/44543 725/40 |
| 2013/0002967 A1* | 1/2013 | Yun | H04N 5/4403 348/734 |

FOREIGN PATENT DOCUMENTS

| | | |
|---|---|---|
| CN | 1550101 A | 11/2004 |
| CN | 1605191 A | 4/2005 |
| CN | 1848288 A | 10/2006 |
| EP | 1 435 731 A1 | 7/2004 |
| EP | 1 655 953 A1 | 5/2006 |
| EP | 1 197 072 B1 | 12/2010 |
| EP | 2 267 997 A2 | 12/2010 |
| EP | 2 352 276 A1 | 8/2011 |
| GB | 2 332 293 A | 6/1999 |
| JP | 9-233400 A | 9/1997 |
| JP | 11-327791 A | 11/1999 |
| JP | 2005-12433 A | 1/2005 |
| WO | 00/59214 A1 | 10/2000 |
| WO | 00/62299 A1 | 10/2000 |
| WO | 00/62533 A1 | 10/2000 |
| WO | 02/084991 A2 | 10/2002 |
| WO | 03052568 A2 | 6/2003 |

OTHER PUBLICATIONS

Communication dated Feb. 17, 2012, from the State Intellectual Property Office of P.R. China in counterpart application No. 200710192829.6.
Chinese Office Action, dated Aug. 9, 2012, issued in corresponding Chinese Patent Application No. 200710192829.6.
Communication issued Aug. 12, 2015, issued by the State Intellectual Property Office of the People's Republic of China in counterpart Chinese Patent Application No. 201310160680.9.
Communication dated Feb. 19, 2016, issued by the State Intellectual Property Office of P.R. China in counterpart Chinese Application No. 201310160680.9.
Communication dated Jun. 9, 2016, issued by the European Patent Office in counterpart European Application No. 07116047.7.
Communication dated Aug. 22, 2016 from the State Intellectual Property Office of the People's Republic of China in counterpart application No. 201310160680.9.

* cited by examiner

FIG. 6

METHOD FOR PROVIDING GUI FOR SELECTING BROADCAST CHANNEL WITH KEYPAD OPERATED BY POINTER AND BROADCAST RECEIVING APPARATUS THEREOF

CROSS-REFERENCE TO RELATED APPLICATIONS

This application is a Continuation Application of U.S. application Ser. No. 13/615,796, filed Sep. 14, 2012, which is a Continuation Application of U.S. application Ser. No. 11/836,934, filed Aug. 10, 2007, which claims the benefit of Korean Patent Application No. 10-2007-0008525 filed on Jan. 26, 2007, in the Korean Intellectual Property Office, the entire disclosures of which are incorporated herein by reference.

BACKGROUND OF THE INVENTION

1. Field of the Invention

Methods and apparatuses consistent with the present invention relate to a method for providing Graphical User Interface (GUI) for selecting a broadcast channel and a broadcast receiving apparatus thereof, and more particularly, a method for providing a Graphical User Interface (GUI) to select a preferred broadcast channel and a broadcast receiving apparatus thereof.

2. Description of the Related Art

A TV is a typical apparatus for receiving a broadcast. A user selects a preferred broadcast channel by using a remote control. More particularly, the broadcast channel is selected by pressing keys of the remote control.

The remote control size is comparatively large because of the number-keys for inputting the broadcast channel. However, users prefer a remote control of small size such that there is a need to provide a method for inputting the preferred broadcast channel using a remote control without number-keys.

SUMMARY OF THE INVENTION

The present invention has been provided to address the above-mentioned and other problems and disadvantages occurring in the conventional arrangement, and an aspect of the present invention provides a method for inputting a preferred broadcast channel without using number-keys, and providing a Graphical User Interface (GUI) to select a broadcast channel having a keypad operable with a pointer, and a broadcast receiving apparatus thereof.

In order to achieve the above object, a method for providing a Graphical User Interface (GUI) for selecting a broadcast channel comprises generating a keypad having a pointer to be moved by manipulation of a user on a remote control apparatus, and keys selectable by the pointer, and combining the generated keypad with an image to be displayed; and tuning to a broadcast channel input by the user using the keypad and the pointer.

The keypad comprises number keys which input numbers, and a subdividing key which divides channel numbers into a major broadcast channel number and a minor broadcast channel number.

The generating and combining the keypad may be conducted, if an icon which inputs a command for calling for the keypad onto the display D, is selected by the pointer.

The generating and combining the keypad may be conducted, if a corresponding manipulation is input by the user using the remote control apparatus.

The corresponding manipulation may comprise double-clicking of a certain key on the remote control apparatus within a reference time.

The method for providing GUI for selecting the broadcast channel further comprises generating a channel list and combining the generated channel list with the image to be displayed; and tuning to a broadcast channel selected by the pointer from broadcast channels listed in the broadcast channel list.

The pointer may be moved in a space by two-dimensional movement of the remote control apparatus by user.

The pointer may move to the same direction as the face of the remote control is moved on a virtual plane which is parallel with the screen of the display D.

The method for providing GUI for selecting the broadcast channel further comprises displaying a broadcast combining the pointer and the keypad on the display; and displaying a broadcast provided from the broadcast channel tuned at the tuning, on the display.

A broadcast receiving apparatus according to the present invention comprises a broadcast receiving unit which tunes to a broadcast channel; a Graphical User Interface (GUI) generator which generates a GUI and combines the generated GUI with an image to be displayed; and a controller which controls the GUI generator which generates a keypad having a pointer to be moved by manipulation of a user on a remote control apparatus and keys selectable by the pointer and combines the generated keypad with an image to be displayed, and controls the broadcast receiving unit which tunes to a broadcast channel input by the user using the keypad and the pointer.

The keypad may comprise number keys which input numbers, and a subdividing key which divides channel numbers into a major broadcast channel number and a minor broadcast channel number.

The controller may control the GUI generator to generate the keypad and combine the generated keypad with the image to be displayed on the display, if an icon which inputs a command for calling for the keypad onto the display D, is selected by the pointer.

The controller may control the GUI generator to generate the keypad and combine the generated keypad with the image to be displayed on the display, if a corresponding manipulation is input by the user using the remote control apparatus.

The corresponding manipulation may comprise double-clicking of a certain key on the remote control apparatus within a reference time.

The controller may control the GUI generator which generates a channel list and combines the generated channel list with the image to be displayed, and controls the broadcast receiving unit which tunes to a broadcast channel selected by the pointer from broadcast channels listed in the broadcast channel list.

The pointer may be moved in a space by two-dimensional movement of the remote control apparatus by user.

The pointer may move to the same direction as the face of the remote control is moved on a virtual plane which is parallel with the screen of the display D.

The Broadcast receiving apparatus further comprises display which displays a broadcast combining the pointer and the keypad, and displays a broadcast provided from the tuned the broadcast channel.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF EXEMPLARY EMBODIMENTS

Certain exemplary embodiments of the present invention will now be described in greater detail with reference to the accompanying drawings.

Figure 1A:
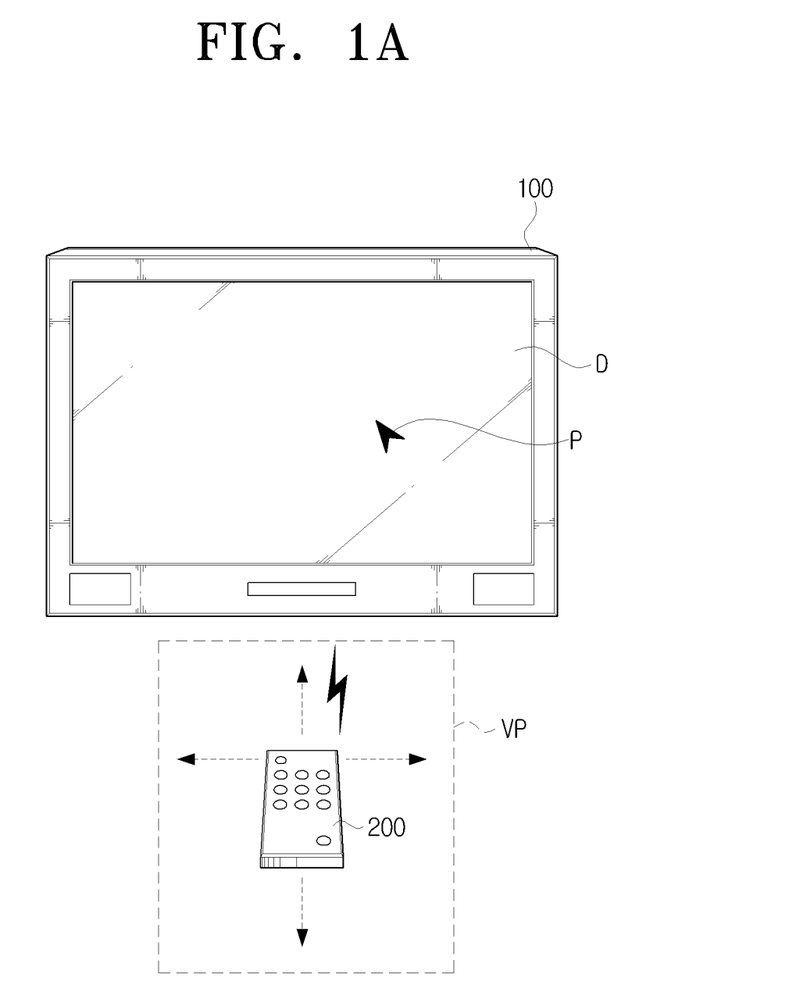
FIGS. 1A to 1C are views illustrating a broadcast receiving system to which an exemplary embodiment of the present invention is applicable.

FIG. 1A is a view illustrating a broadcast receiving system according to an exemplary embodiment of the present invention. Referring to FIG. 1A, a broadcast receiving system comprises a DTV 100 as a broadcast receiving apparatus and a remote control (remote control apparatus) 200 as a user input apparatus.

The DTV 100 provides a user with a broadcast received over wire or wirelessly, through a display D. Additionally, the DTV 100 may provide a user with an external input received from an external apparatus which is connected over wire or wirelessly, through the display D, and may also provide a user with a broadcast by reproducing a file, such as a moving image file, a still image file, and a music file, stored in a built-in storage media.

The remote control 200 sends information on the manipulation of the user to the DTV 100, and the DTV 100 operates according to the received information. Although the remote control 200 of FIG. 1A includes a plurality of keys, the remote control 200 may include either one or two keys as occasion demands. A plurality of keys are provided on the top side of the remote control 200, but the plurality of keys may be provided on the other sides such as the left or right side, or the bottom.

As indicated by dotted arrows in FIG. 1A, the face of the remote control 200 may be moved in a space by the user in an upwards or downwards direction, or to the left or right, or in a direction combining two of these directions, such as an upper-leftwards direction. That is, the face of the remote control 200 may be moved in any direction.

Figure 1B:
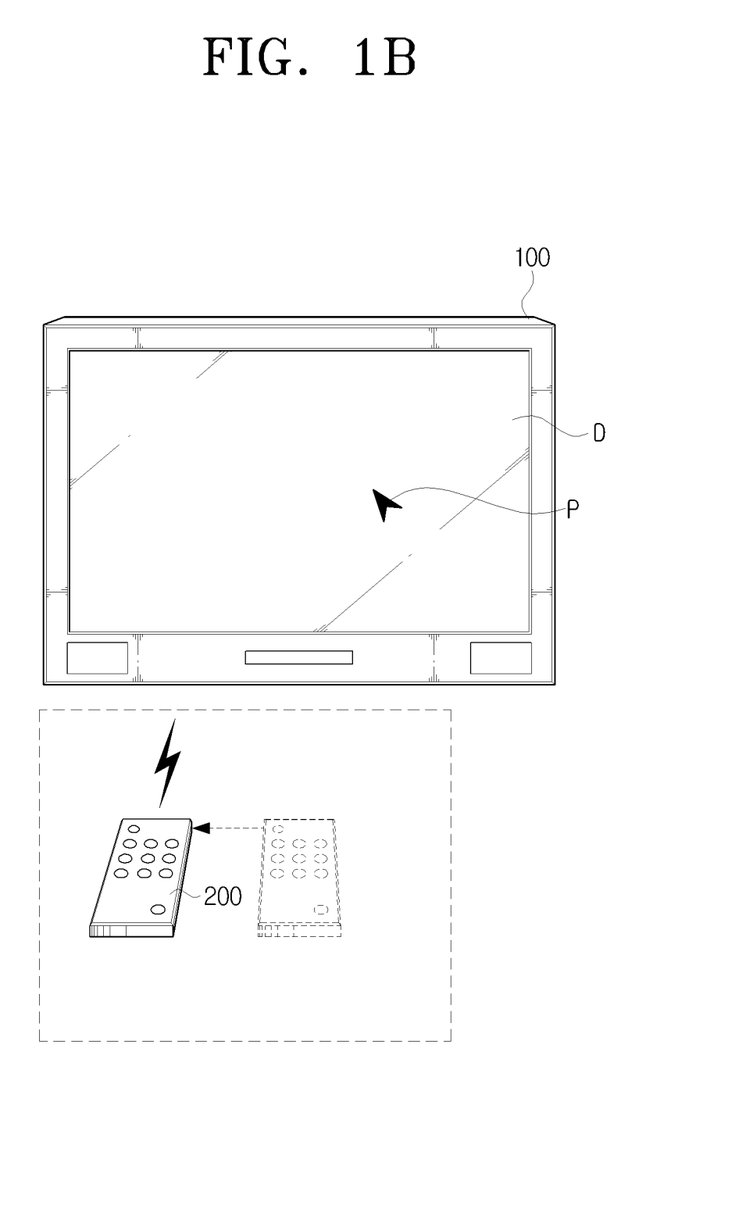

For example, the face of the remote control 200 may be moved while drawing a locus on a virtual plane (VP) which is in a parallel relation with a screen of the display D. FIG. 1B is a view illustrating a case in which the face of the remote control 200 is moved to the left direction while drawing a locus on a virtual plane which is in a parallel relation with the screen of the display D by the user.

The VP may not be in a complete parallel relation with the screen of the display D, and may not be a complete plane. That is, it is practically impossible for the movement of the face of the remote control 200 by the user to be on a complete plane and in a complete parallel relation with the screen of the display D.

Accordingly, the present invention is applicable to the case in which the face of the remote control 200 moves on an incomplete plane and in an incomplete parallel relation with the screen of the display D.

A user may move the face of the remote control 200 by turning only the user's wrist while the user's arm holding the remote control 200 is fixed.

Figure 1C:
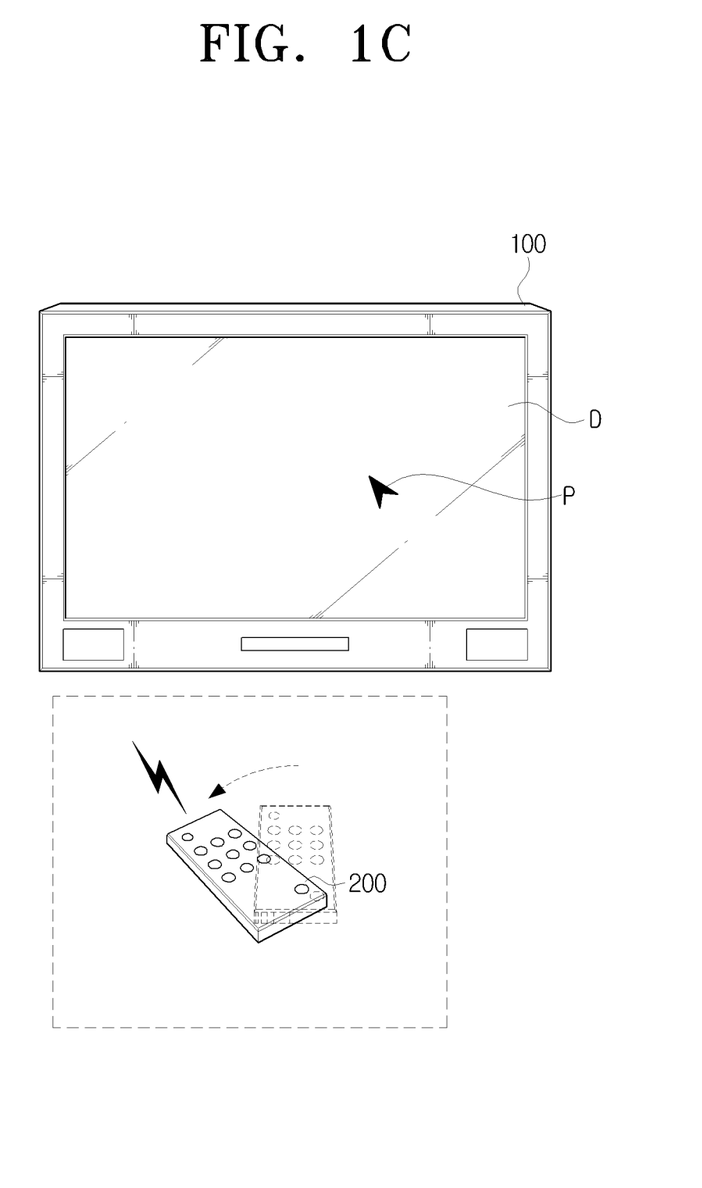

If only the user's wrist moves in an upwards or downwards direction, or to the left or right, or in a direction combining these, such as an upper leftward direction, the face of the remote control 200 may be moved upwards, downwards, or to the left or right, or in a direction combining these, such as an upper leftwards direction while drawing a curved locus on a virtual hemisphere surface. FIG. 1C is a view illustrating the case in which the face of the remote control 200 is moved to the left by a user while drawing a curved locus on a virtual hemisphere surface.

The virtual hemisphere surface, on which the face of the remote control 200 is moved by rotation of the user's wrist, may be a mathematically incomplete hemisphere surface. That is, it is practically impossible for the face of the remote control 200 to be moved by rotating the user's wrist while drawing a locus on a mathematically complete hemisphere surface.

Accordingly, the present invention may be applicable to the case in which the face of the remote control 200 moves not on a mathematically complete hemisphere but an incomplete hemisphere surface while drawing a curved locus.

That is, the pointer P displayed on the display D may be moved by the user spatially moving the remote control 200. The spatial movement of the face of the remote control 200 is distinguished from the movement of a mouse for a personal computer (PC) which is moved over a surface.

When the face of the remote control 200 is moved in a space, the pointer P displayed on the display D moves in the same direction as the face of the remote control 200. For example, i) if a user moves the face of the remote control 200 upwards within a space, the pointer P may move upwards, and ii) if the user moves the face of the remote control 200 to the upper-left in a space, the pointer P may move to the upper-left.

Figure 2:
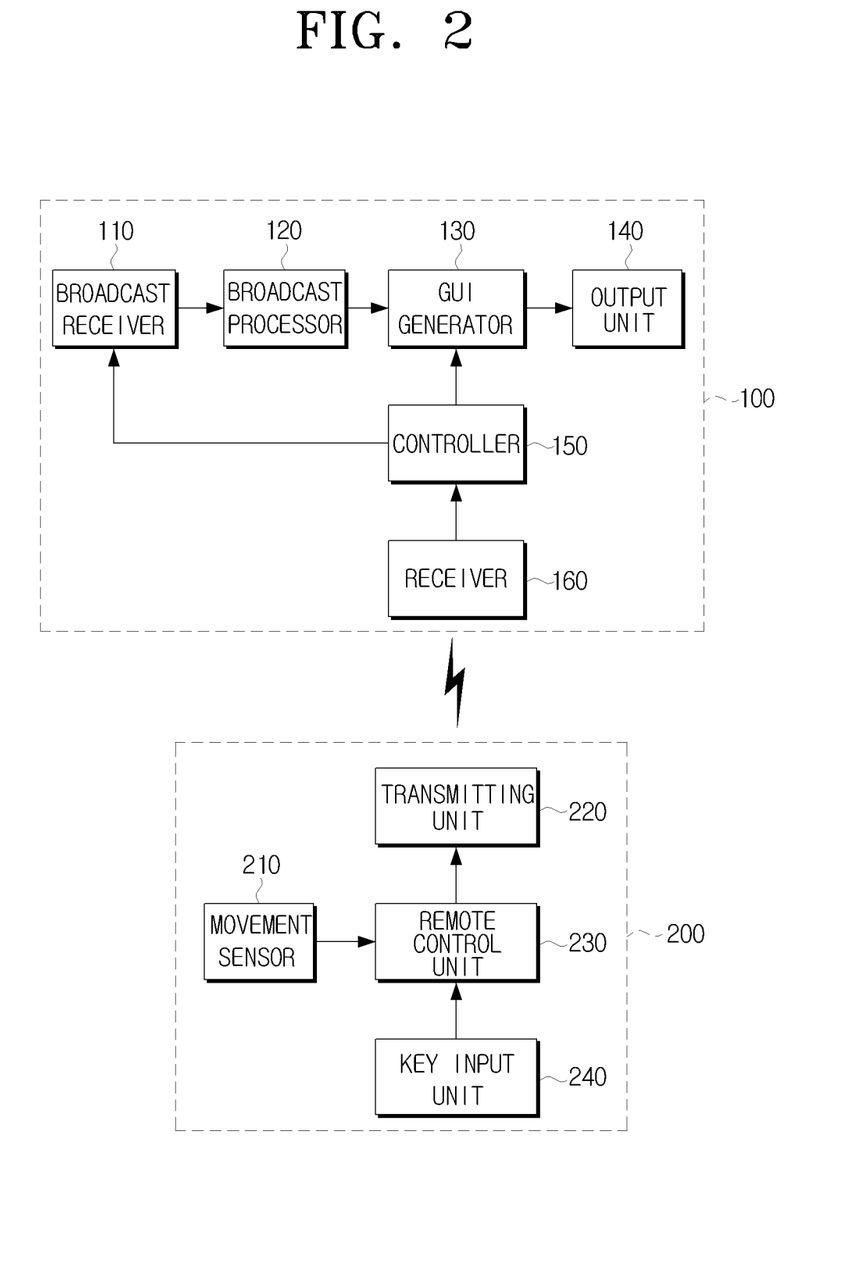
FIG. 2 is a block diagram of a TV and a remote control of FIG. 1.

Hereinafter, the TV 100 and the remote control 200 illustrated in FIG. 1 will be explained in detail with reference to FIG. 2. FIG. 2 is a block diagram of the TV 100 and the remote control 200 of in FIG. 1.

Referring to FIG. 2, the remote control 200 includes a movement sensor 210, a transmitting unit 220, a remote control unit 230, and a key input unit 240.

The movement sensor 210 senses the movement of the face of the remote control 200 by the user, and sends the result of sensing to the remote control unit 230 which will be explained in detail below. An exemplary implementation may use a biaxial gyro sensor as the movement sensor 210.

The key input unit 240 may include a power key, a channel key, a volume key, and a select key.

The remote control unit 230 transmits information on the movement such as moving direction, moving distance, which is obtained from the sensing result transmitted from the movement sensor 210, to the TV 100 via the transmitting unit 220. The remote control unit 230 also sends the TV 100 information about keys input by the user through the transmitting unit 220.

Referring to FIG. 2, the TV 100 includes a broadcast receiver 110, a broadcast processor 120, a Graphic User Interface (GUI) generator 130, an output unit 140, a controller 150, and a receiver 160.

The broadcast receiver 110 tunes to one of the broadcast channels and demodulates a broadcast signal. The broadcast processor 120 executes broadcast signal processing such as decoding, or scaling of the broadcast signal provided from the broadcast channel tuned by broadcast receiver 110.

The GUI generator 130 generates a GUI to display on the display D, and combines the GUI with the broadcast output from the broadcast processor 120.

The output unit 140 may display broadcast combining the GUI output from the GUI generator 130 on the display D, or output to an external display such as external TV connected through an external output terminal (not shown).

The controller 150 controls the overall operation of the TV according to the user's manipulation including movement of the face of the remote control 200, or a key input, which is transmitted from the remote control 200 via the receiver 160. More specifically, the controller 150 controls the tuning of the broadcast receiver 110, and the generation of the GUI by the GUI generator 130.

Figure 3:
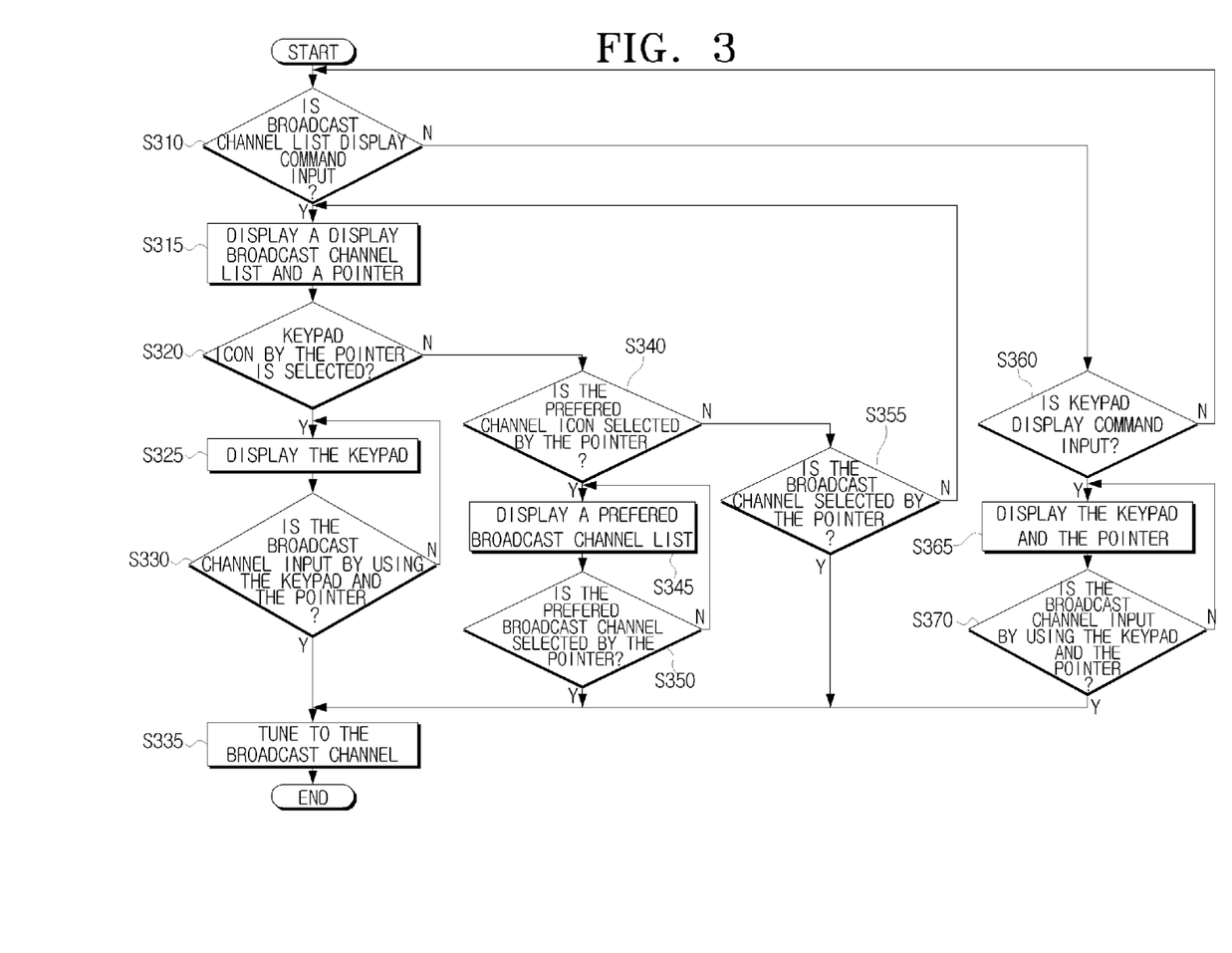
FIG. 3 is a flow chart illustrating a method for providing GUI for selecting a broadcast channel according to an exemplary embodiment of the present invention.

The controller 150 controls the GUI generator 130 to provide GUI for selecting a broadcast channel having an operable keypad usable with a pointer P, and controls the broadcast receiver 110 to tune to a broadcast channel selected by the user using the GUI for selecting a broadcast channel, which will be described in detail below referring to FIG. 3. FIG. 3 is a flowchart illustrating a method for providing GUI for selecting a broadcast channel in accordance with an exemplary embodiment of the present invention.

Referring to FIG. 3, if a broadcast channel list display command is input (S310-Y), the controller 150 controls such that a broadcast channel list and a pointer P are displayed on the display D (S315).

The broadcast channel list display commend at S310 may be input by pressing the channel key on the key input unit 240.

To execute S315, the controller 150 controls the GUI generator 130 to combine the broadcast channel list and the pointer P with a broadcast to be displayed on the display D.

Figure 4A:
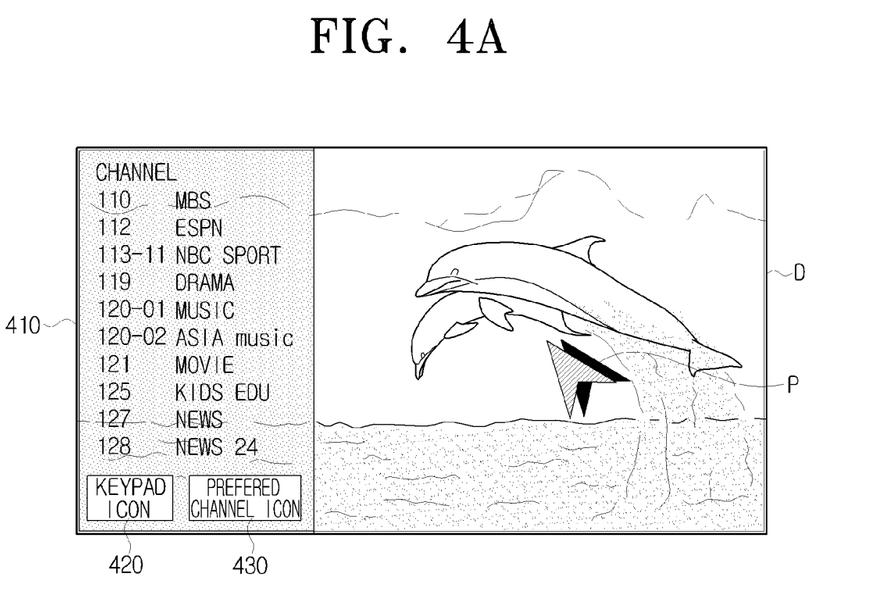
FIGS. 4A to 4E are views illustrating the method for providing GUI for selecting a broadcast channel of FIG. 3.

FIG. 4A illustrates an example of the display D displaying the broadcast channel list 410 and the pointer P combined at S315. Referring to FIG. 4A, a keypad icon 420 and a preferred channel icon 430 are displayed at the bottom of the broadcast channel list 410.

The keypad icon 420 is used to input a command for calling for the keypad onto the display D, and the preferred channel icon 430 is used to input a command for calling for a preferred broadcast channel list onto the display D.

If the keypad icon 420 is selected by the pointer P (S320-Y), the controller 150 controls such that the keypad is displayed on the display D (S325).

The selection at S320 is executed by moving the face of the remote control 200 on the VP to move the pointer P to point the keypad icon 420, and then by pressing the select key on the key input unit 240 of the remote control 200.

To execute process S325, the controller 150 controls the GUI generator 130 to generate a keypad and combine the generated keypad with the broadcast displayed on the display D.

Figure 4B:
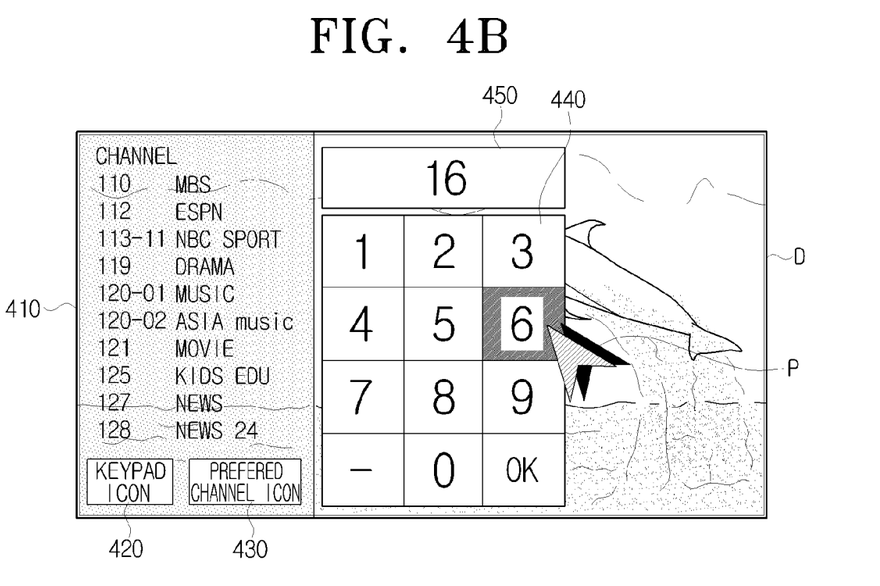

FIG. 4B illustrates an example of the display D displaying the keypad 440 combined at S325 at the right of the broadcast channel list 410. Referring to FIG. 4B, the keypad 440 includes number keys (0~9) to input numbers, a subdividing key (–) to divide channel numbers into a major broadcast channel number and a minor broadcast channel number, and an input completion key (OK) to confirm an input completion. The keys may be selected by using the pointer P.

Referring to FIG. 4B, an input window 450 is displayed at the top of the keypad 440. The input window 450 displays the numbers (0~9) and the subdividing (–) as selected by the pointer P on the keypad 440. For example, number "16" is displayed on the input window 450 in FIG. 4B. It means that the user selects number keys "1" and "6" by using the keypad 440 and the pointer P.

Figure 4C:
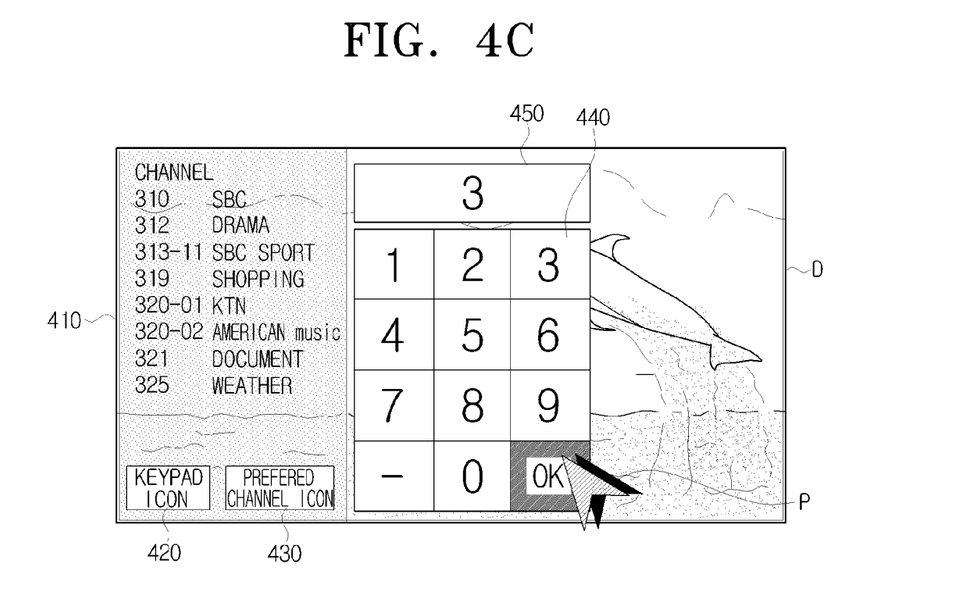

According to the number key input by the user using the keypad 440 and the pointer P, the broadcast channels being listed in the broadcast channel list 410 may be changed. More specifically, all the broadcast channels including the number input by using the keypad 440 and the pointer P may be displayed in the broadcast channel list. For example, referring to FIG. 4C, if the user selects the number key "3" by using the keypad 440 and the pointer P, all the broadcast channels beginning with "3" may be listed in the broadcast list 410. In another example, if the user selects the number key "3" by using the keypad 440 and the pointer P, all the broadcast channels such as 13, 311, 93 including "3" may be listed in the broadcast list 410.

If the broadcast channel is input by using the keypad 440 and the pointer P displayed at S325 (S330), the controller 150 controls the broadcast receiver 110 such that the input broadcast channel is tuned (S335). The broadcast provided from the broadcast channel tuned at S335 is displayed on the display D.

The broadcast channel input at S330 is terminated i) if the input completion key (OK) on the keypad 440 is selected by the pointer P, or ii) if no key is selected by the pointer P for a reference time (for example, for 2 seconds), after inputting the broadcast channel by using the keypad 440 and the pointer P.

Meanwhile, if the preferred channel icon 430 is selected by the pointer P after S315 (S320-N and S340-Y), the controller 150 controls such that the preferred channel list is displayed on the display D (S345).

The selection at S340 is executed by moving the face of the remote control 200 on the VP to move the pointer P to point the preferred channel icon 430, and then by pressing the select key on the key input unit 240 of the remote control 200.

To execute S345, the controller 150 controls the GUI generator 130 to generate a preferred broadcast channel list and combine the generated preferred broadcast channel list with a broadcast to be displayed on the display D.

Figure 4D:
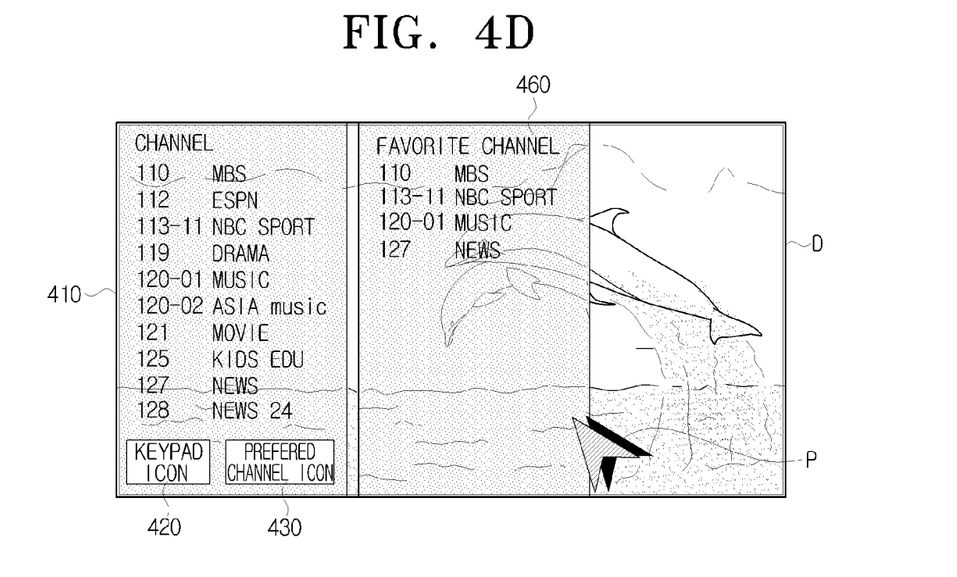

FIG. 4D illustrates an example of the display D listing a preferred broadcast channel list 460 combined at S345 at the right of the broadcast channel list 410. Referring to FIG. 4D, the preferred broadcast channels are listed on the preferred broadcast channel list 460, and the user may select one of the preferred broadcast channels listed by using the pointer P.

If one of the preferred broadcast channels listed on the preferred broadcast channel list displayed at S345 is selected by the pointer (S350-Y), the controller 150 controls the broadcast receiver 110 such that the selected preferred broadcast channel is tuned (S335). The broadcast provided from broadcast channel tuned at S335 is displayed on the display D.

Meanwhile, if one of the broadcast channels listed on the broadcast channel list 410 displayed at S315 is selected by the pointer (S320-N, S340-N, and S355-Y), the controller 150 controls the broadcast receiver 110 such that the selected broadcast channel is tuned (S335). The broadcast provided from the broadcast channel tuned at S335 is displayed on the display D.

Meanwhile, if a keypad display command is input (S310-N and D360-Y) when the broadcast channel list 410 is not displayed on the display D, the controller 150 controls such that the keypad 440 and the pointer P are displayed on the display D (S365).

The keypad display command at S360 may be input by double-clicking the channel key on the key input unit 240 of the remote control 200 within one second.

To execute the S365, the controller 150 controls the GUI generator 130 to combine the keypad 440 and the pointer P with a broadcast to be displayed on the display D.

Figure 4E:
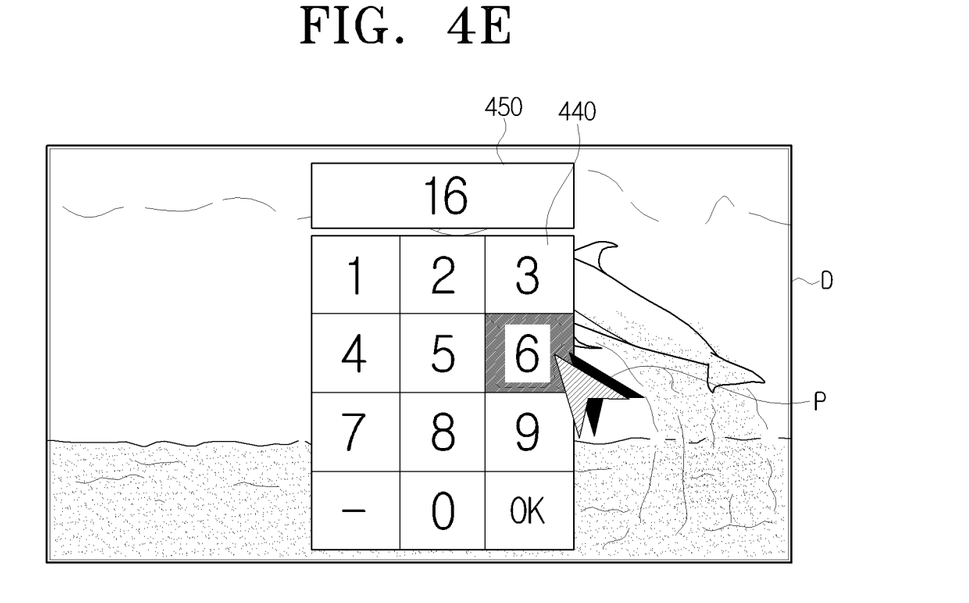

FIG. 4E illustrates an example of the display D displaying the keypad 440 and the pointer P combined at S365. The GUI for selecting channel displayed on the display D illustrated in FIG. 4E has a different form from GUI for selecting channel on the display D illustrated in FIG. 4B, that is, the broadcast channel list 410 is not displayed in FIG. 4E.

If the broadcast channel is input by using the keypad 440 and the pointer P displayed at S365 (S370-Y), the controller 150 controls the broadcast receiver 110 to tune to the input broadcast channel (S335). Accordingly, the broadcast provided from the broadcast channel tuned at S335 is displayed on the display D.

As described above, the process of tuning to a broadcast channel selected through GUI for selecting a broadcast channel having an operable keypad usable with the pointer is explained with exemplary embodiments of the present invention.

According to the exemplary embodiments of the present invention, the broadcast channel may be selected through not only a keypad operable with a pointer, but also a preferred broadcast channel list or a broadcast channel list operable with a pointer.

Although the exemplary embodiments have described the TV as an example of the broadcast receiving apparatus, the broadcast receiving apparatus may be implemented as a set top box (STB), a digital multimedia broadcast (DMB) receiving apparatus, and a portable apparatus with a built-in module for receiving broadcast such as a mobile phone with a built in module for receiving DMB. In the case of the portable apparatus, a pointer may be moved by using a touch pad instead of a remote control.

The pointer and the keypad forming a GUI for selecting a broadcast channel may be embodied in the form as illustrated in FIG. 4B, but different forms are possible. Keys on the keypad may also be configured in a different form from FIG. 4B, according to alternative examples of the present invention.

In the exemplary embodiments, when the broadcast channel list is not displayed on the display, the command to display the keypad is input by double-clicking the channel key on the remote control within one second. Herein, "one second" may be changed as occasion demands.

Instead of double-clicking the certain key on the remote control within the reference time, another examples such as pressing once the certain key on the remote control, are possible to cause the keypad to display while the broadcast channel list is not displayed on the display.

Another exemplary embodiment of the present invention is described with reference to the FIGS. 5 and 6.

Figure 5:
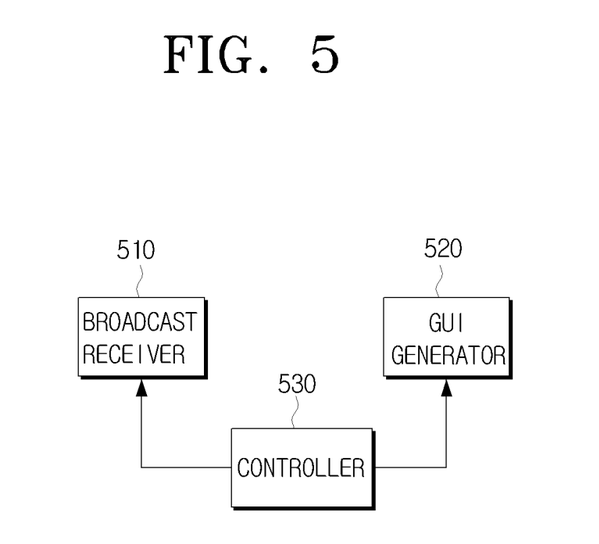
FIG. 5 is a block diagram of a broadcast receiving apparatus according to another exemplary embodiment of the present invention.

Referring to FIG. 5, the broadcast receiving apparatus according to another exemplary embodiment of the present invention includes a broadcast receiver 510, a GUI generator 520, and a controller 530.

The broadcast receiver 510 tunes to a broadcast channel, the GUI generator 520 generates a GUI and combines the generated GUI with a image displayed, and the controller 530 controls the GUI generator 520 to generate a pointer to be moved by manipulation of the user on a remote control, and a keypad having selectable keys by the pointer, and to combine the generated pointer and keypad with the displayed image. The controller 530 controls the broadcast receiver 510 to tune to a broadcast channel input by using the keypad and the pointer.

Figure 6:
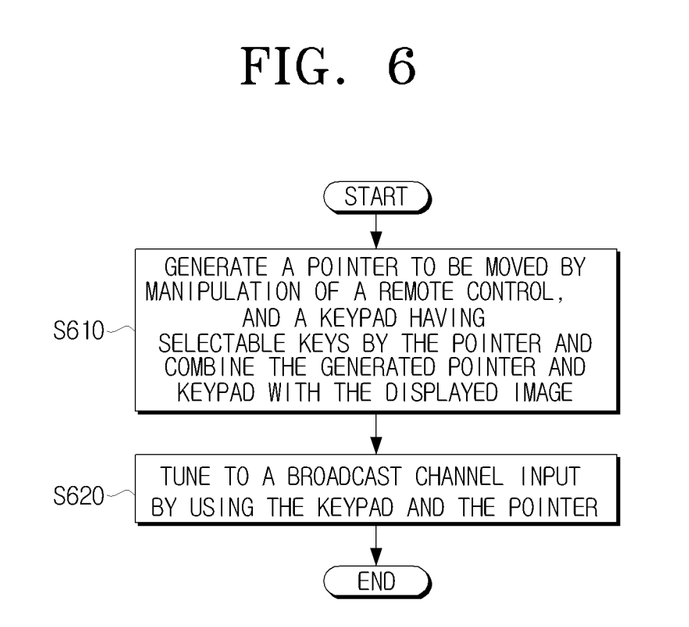
FIG. 6 is a flow chart explaining a method for providing GUI for selecting a broadcast channel according to another exemplary embodiment of the present invention.

According to the method for providing the GUI for selecting the broadcast channel illustrated in FIG. 6, the controller 530 controls the GUI generator 520 to generate a pointer to be moved by manipulation of the user on a remote control, and a keypad having selectable keys by the pointer and to combine the generated pointer and keypad with the displayed image (S610). The controller 530 controls the broadcast receiver 510 to tune to a broadcast channel input by using the keypad and the pointer (S620).

Accordingly, a GUI for selecting a broadcast channel having an operable keypad with a pointer may be provided.

According to the exemplary embodiments of the present invention as described above, the broadcast channel is selected with a keypad usable with a pointer. Accordingly, the user is able to input a preferred broadcast channel without using the number keys, so the number keys may be omitted in the remote control apparatus. As a result, miniaturization of the remote control apparatus is possible.

Further, the foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a graphical user interface for selecting a broadcast channel in a television, the method comprising:
   receiving information about a movement of a remote control to control a pointer displayed on a screen of the television;
   receiving a first input from the remote control for displaying a keypad on the screen;
   displaying the keypad on the screen in response to the first input;
   receiving a second input from the remote control to select one of numerical keys displayed on the keypad based on a position of the pointer over the one of the numerical keys displayed on the keypad;
   displaying a number corresponding to the selected numerical key in an input window for the keypad displayed on the screen and displaying a channel list including a broadcast channel number starting with the number corresponding to the selected numerical key, the number corresponding to the selected numerical key and the channel list including the broadcast channel number being simultaneously displayed; and
   if the pointer is moved to one of at least one broadcast channel included in the channel list by a user moving the remote controller and a broadcast channel where the pointer is located is selected by a user input, tuning to the selected broadcast channel, wherein the keypad is removed from the screen when a predetermined area that is noncontiguous with an area in which the keypad is displayed and that is displayed outside of the keypad on the screen is selected by the pointer, and wherein the channel list remains displayed in response to the predetermined area being selected by the pointer while the channel list and the keypad are displayed.

2. The method of claim 1, wherein the first input comprises a first selection input made on a keypad icon displayed on the screen when the pointer is displayed over the keypad icon.

3. The method of claim 1, wherein the keypad further comprises a separation key which divides a channel number into a major broadcast channel number and a minor broadcast channel number.

4. The method of claim 1, wherein the channel list, the input window, and the keypad are respectively displayed on the screen in a separate non-overlapping manner.

5. The method of claim 1, further comprising tuning to another broadcast channel by using the keypad and the pointer or tuning to the other broadcast channel from broadcast channels listed in the channel list by using the pointer.

6. The method of claim 1, wherein at least one of the channel list, the input window and the keypad is translucent such that an image of the broadcast channel is visible through the at least one of the channel list, the input window and the keypad.

7. The method of claim 1, wherein the remote control comprises a movement sensor that is configured to sense a movement of the remote control.

8. The method of claim 7, wherein the movement sensor comprises a gyroscopic sensor.

9. The method of claim 7, wherein the movement of the remote control is a movement of the entire remote control.

10. A non-transitory computer-readable recording medium having recorded thereon a program for executing the method of claim 1.

11. A display apparatus that provides a graphical user interface for selecting a broadcast channel, the display apparatus comprising:
 a display;
 a remote control; and
 a controller which is configured to receive information about a movement of the remote control to control a pointer displayed on a screen of the display, control the display to display a keypad on the screen in response to receiving a first input from the remote control, control the display to display a number in an input window corresponding to the keypad in response to receiving a second input from the remote control to select the number from numbers displayed on the keypad based on a position of the pointer over the selected number of the numbers displayed on the keypad, and control the display to display a channel list including a broadcast channel number starting with the selected number of the numbers displayed on the keypad, the selected number from the numbers displayed on the keypad and the channel list including the broadcast channel number being simultaneously displayed,
 wherein the controller is further configured to tune to the selected broadcast channel if the pointer is moved to one of at least one broadcast channel included in the channel list by a user moving the remote controller and a broadcast channel where the pointer is located is selected by a user input, wherein the keypad is removed from the screen when a predetermined area that is noncontiguous with an area in which the keypad is displayed and that is displayed outside of the keypad on the screen is selected by the pointer, and wherein the channel list remains displayed in response to the predetermined area being selected by the pointer while the channel list and the keypad are displayed.

12. The display apparatus of claim 11, wherein the receiving the second input further comprises making a second selection input of a second number from the numbers displayed on the keypad based on a position of the pointer over the second number of the numbers displayed on the keypad.

13. The display apparatus of claim 11, wherein the keypad further comprises a separation character which divides a channel number into a major broadcast channel number and a minor broadcast channel number.

14. The display apparatus of claim 11, wherein controller is further configured to control the display to display the channel list, the input window, and the keypad in a separate non-overlapping manner.

15. The display apparatus of claim 11, wherein the controller is further configured to tune the display apparatus to another broadcast channel in response to input into the keypad by using the pointer or to tune to the other broadcast channel in response to a selection of the other broadcast channel from broadcast channels in the channel list by using the pointer.

16. The display apparatus of claim 11, wherein at least one of the channel list, the input window and the keypad is translucent such that an image of the broadcast channel is visible through the at least one of the channel list, the input window and the keypad.

17. The display apparatus of claim 11, wherein the remote control comprises a movement sensor that is configured to sense a movement of the remote control.

18. The display apparatus of claim 11, wherein the display apparatus comprises a television.

19. The display apparatus of claim 11, wherein the movement of the remote control is a movement of the entire remote control.

20. A display apparatus that provides a graphical user interface for selecting a broadcast channel, the display apparatus comprising:
 a display; and
 a controller which is configured to receive information about a movement and control a pointer displayed on a screen of the display based on the movement, control the display to display a keypad on the screen in response to receiving a first input, control the display to display a number in an input window corresponding to the keypad in response to receiving a second input to select the number from numbers displayed on the keypad based on a position of the pointer over the selected number of the numbers displayed on the keypad, and control the display to display a channel list including a broadcast channel number starting with the selected number of the numbers displayed on the keypad, the selected number from the numbers displayed on the keypad and the channel list including the broadcast channel number being simultaneously displayed, wherein the controller is further configured to tune to the selected broadcast channel if the pointer is moved to one of at least one broadcast channel included in the channel list by a user moving the remote controller and a broadcast channel where the pointer is located is selected by a user input, wherein the keypad is removed from the screen when a predetermined area that is noncontiguous with an area in which the keypad is displayed and that is displayed outside of the keypad on the screen is selected by the pointer, and wherein the channel list remains displayed in response to the predetermined area being selected by the pointer while the channel list and the keypad are displayed.

21. The display apparatus of claim 20, wherein the first input comprises a first selection input made on a keypad icon displayed on the screen when the pointer is displayed over the keypad icon.

22. The display apparatus of claim 20, wherein controller is further configured to control the display to display the channel list, the input window, and the keypad in a separate non-overlapping manner.

\* \* \* \* \*